Aug. 23, 1966   J. E. LINDBERG, JR   3,267,857
NOSE-CONE COOLING OF SPACE VEHICLES
Original Filed April 5, 1962   3 Sheets-Sheet 1
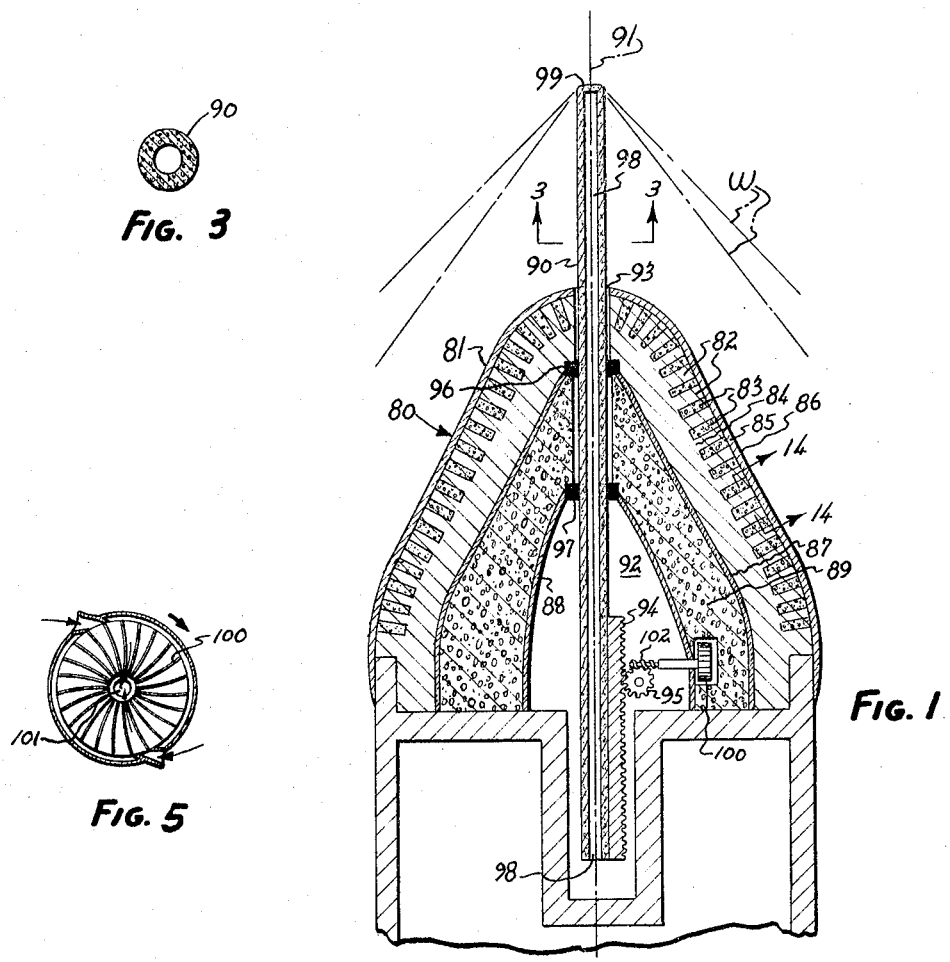
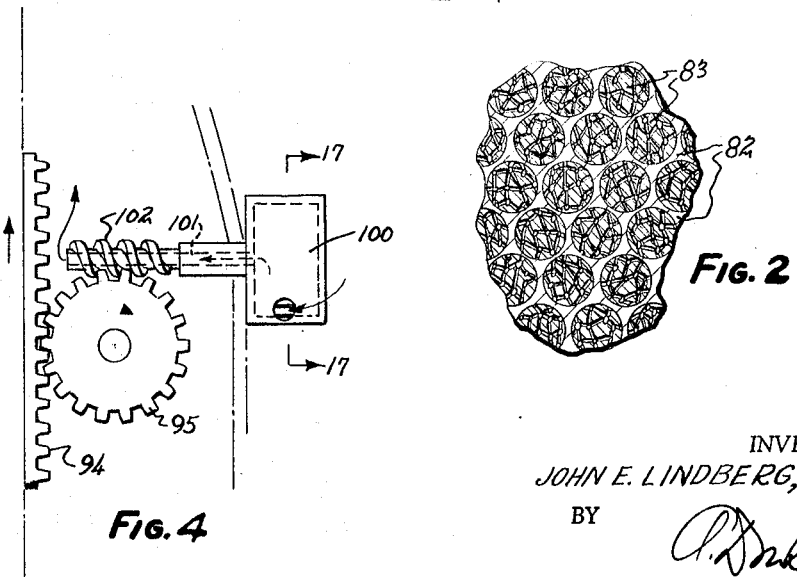
INVENTOR.
JOHN E. LINDBERG, JR.
BY
ATTORNEY

INVENTOR.
JOHN E. LINDBERG, JR.
BY
ATTORNEY

Aug. 23, 1966  J. E. LINDBERG, JR  3,267,857
NOSE-CONE COOLING OF SPACE VEHICLES
Original Filed April 5, 1962  3 Sheets-Sheet 3
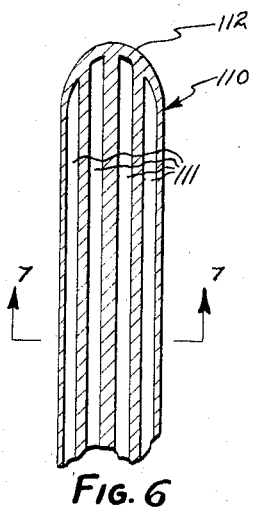
FIG. 6
FIG. 7
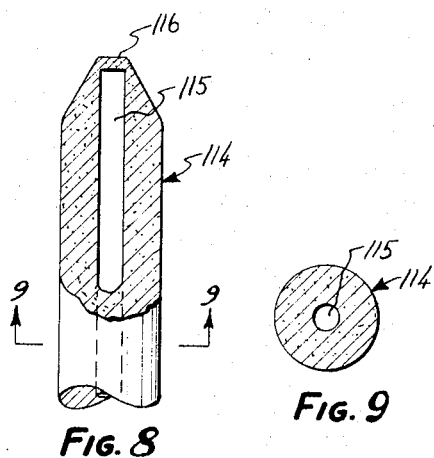
FIG. 8
FIG. 9
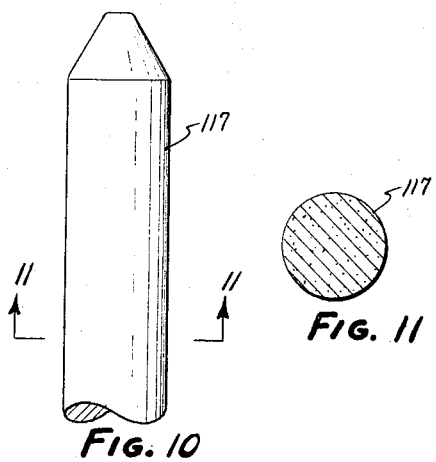
FIG. 10
FIG. 11
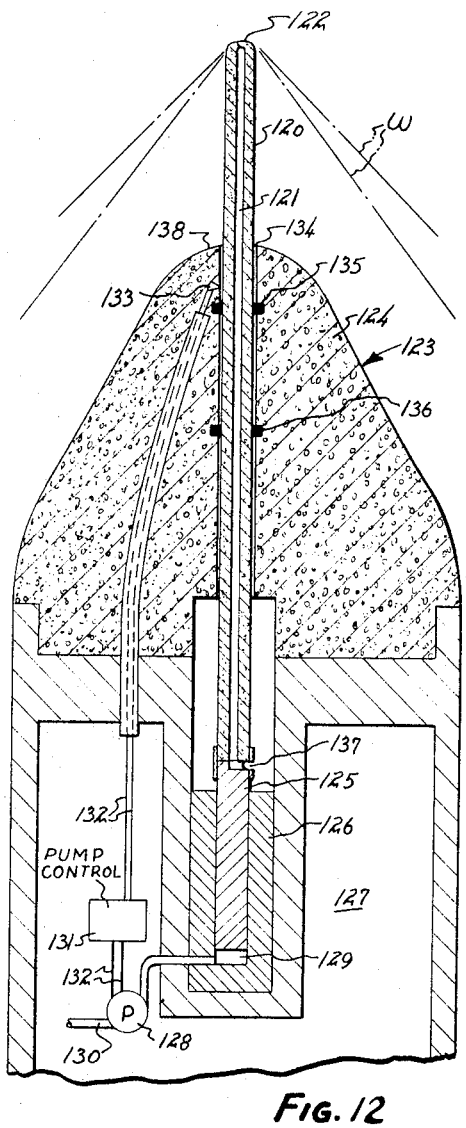
FIG. 12
INVENTOR.
JOHN E. LINDBERG, JR.
BY
ATTORNEY

United States Patent Office 3,267,857
Patented August 23, 1966

---

3,267,857
NOSE-CONE COOLING OF SPACE VEHICLES
John E. Lindberg, Jr., 1211 Upper Happy Valley Road, Lafayette, Calif.
Original application Apr. 5, 1962, Ser. No. 186,600. Divided and this application Aug. 10, 1964, Ser. No. 389,518
8 Claims. (Cl. 102—92.5)

This invention relates to the nose-cone cooling of space vehicles including missiles and more particularly to missiles whose nose structures incorporate means for dissipating heat therefrom. This application is a division of application Serial No. 186,600, filed April 5, 1962, which was a continuation-in-part of application Serial No. 725,110, filed March 31, 1958, now abandoned.

It is well known that an object entering the earth's atmosphere at even moderate speed is heated considerably by the attendant aerodynamic conditions at the surface of the object. Such heating occurs when vehicles re-enter the atmosphere and is a serious problem, forcing drastic limitations on the maximum re-entry speed which a structure of given design can attain without being severely damaged or even destroyed. This heat is primarily developed and is largely concentrated at the nose.

An important object of the present invention is to efficiently dissipate the heat developed at the nose. By achieving this object, the invention makes it possible to use higher re-entry speeds and therefore gives greater freedom in missile design and increases the missile's ability to avoid interception.

Another object of this invention is to provide a missile structure wherein the heat developed at the nose surface is carried to other parts of the missile and dissipated there, thereby lowering the nose temperature.

Other objects and advantages of the invention will appear from the following detailed description of some preferred embodiments thereof.

In the drawings:

FIG. 1 is a view in elevation and in section of the forward end of a missile embodying the principles of the invention.

FIG. 2 is a view in section taken along the line 2—2 in FIG. 1.

FIG. 3 is a view in section taken along the line 3—3 in FIG. 1.

FIG. 4 is a greatly enlarged detail view of the worm drive and turbine assembly of FIG. 1.

FIG. 5 is a view in section of the interior contents of the turbine assembly, taken along the line 5—5 in FIG. 4.

FIG. 6 is a view in elevation and in section of a modified form of shock diffusion rod, for use in a missile like that of FIG. 1.

FIG. 7 is a view in section taken along the line 7—7 in FIG. 6.

FIG. 8 is a view similar to FIG. 6 showing another modified form of shock diffusion rod.

FIG. 9 is a view in section taken along the line 9—9 in FIG. 8.

FIG. 10 is a view similar to FIG. 6 showing another modifiied form of shock diffusion rod.

FIG. 11 is a view in section taken along the line 11—11 in FIG. 10.

FIG. 12 is a view in elevation and in section of a missile nose showing another modified form of motorized shock diffusion rod.

Figures 13, 26:
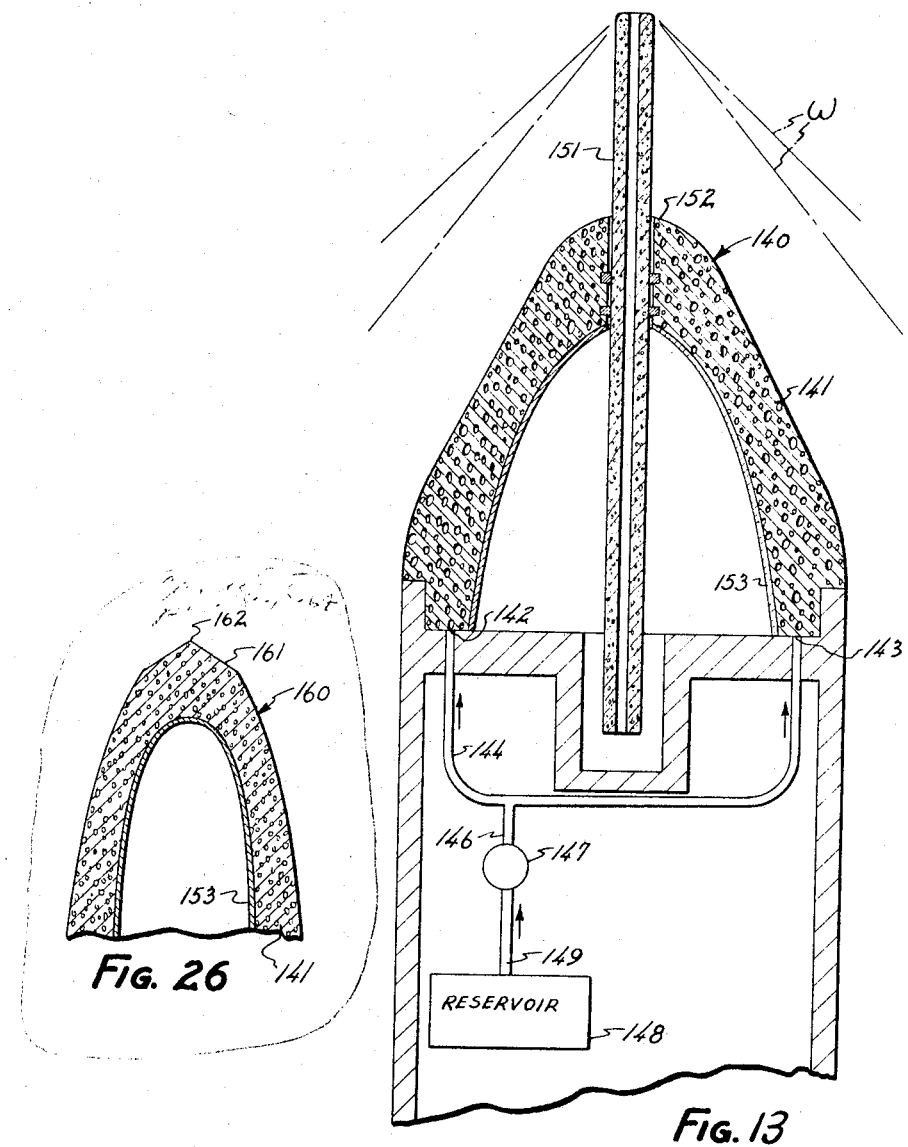
FIG. 13 is a view similar to FIG. 12 showing another modified form of structure.

In order to illustrate the invention more clearly, the figures have been made somewhat diagrammatic in form and do not show the contents within the shell since the undesirable heat is developed at the shell and must be dissipated therefrom. The invention is independent of the contents of the vehicle itself.

This invention employs heat-dissociable material which may be comprised of hydrides of the so-called getter metals. These hydrides, as explained in my co-pending application Serial No. 695,357, filed November 8, 1957, now Patent No. 3,075,361 are valuable heat-transfer agents, because the metallic hydride is dissociated into metal and hydrogen in an endothermic reaction, absorbing a large amount of heat per unit weight and per unit volume, as illustrated in Tables I and II below.

TABLE I
*Thermodynamic properties of typical alkaline and alkaline earth hydrides*

| Hydride | Heat of dissociation in gram-calories per gram of compound | Heat of dissociation in gram-calories per cubic centimeter of compound | Latent heat of fusion of the metal in calories per cubic centimeter | Latent heat of vaporization of the metal in calories per cubic centimeter | Specific heat of the metal in calories per cubic centimeter per ° C. near 20° C. |
|---|---|---|---|---|---|
| LiH | 2,720 | 2,230 | 53 | 2,590 | 0.418 |
| NaH | 571 | 788 | 26 | 9,850 | 0.29 |
| KH | 339 | 492 | 13 | 426 | 0.15 |
| $CaH_2$ | 1,070 | 2,030 | 80 | 1,490 | 0.23 |
| $SrH_2$ | 426 | 1,382 | 67 | 1,070 | 0.46 |
| $BaH_2$ | 294 | 1,238 | 47 | 1,080 | 0.08 |

TABLE II
*Thermodynamic properties of typical Group B hydrides*

| Hydride | Heat of dissociation in gram-calories per gram of compound | Heat of dissociation in gram-calories per cubic centimeter of compound | Latent heat of fusion of the metal in calories per cubic centimeter | Latent heat of vaporization of the metal in calories per cubic centimeter | Specific heat of the metal in calories per cubic centimeter per ° C. near 20° C. |
|---|---|---|---|---|---|
| $TiH_{1.75}$ | 634 | 2,480 | 471 | 10,050 | 0.62 |
| $ZrH_{1.92}$ | 418 | 2,275 | 392 | 10,150 | 0.45 |
| $PdH_{0.59}$ | 237 | 255 | 456 | 12,400 | 0.70 |

Certain metals such as copper, tungsten, iron, and nickel which form hydrides of the class known as Group A (others are listed in my referred-to patent application Serial No. 695,357) are suitable for use when combined with Group B hydrides. The formation of a Group A hydride is endothermic, and, since the dissociation of a Group B hydride is also endothermic, the combination of a type A metal with a Group B hydride will absorb heat as the temperature of the surrounding medium is elevated. Some properties of type A hydrides are listed in Table III.

may also, under favorable conditions, be used for the heat transfer process. The magnitude of heat of dissociation of hydrogen is on the order of 100 k. cal./mole $H_2$ and that for the ionization is on the order of 300 k. cal./mole hydrogen ions. In addition, when metallic vapor is present, it may also be possible to utilize its heat of dissociation and of ionization as valuable heat transfer mechanisms. Most gases are fully dissociated above 8000° K. and are ionized above 16,000° K. at one atmosphere of pressure. Whether the aforementioned properties are useful in a particular application, depends

TABLE III

*Therodynamic properties of typical hydrides of Group A materials*

| Hydride | Heat of formation in gram-calories per gram of compound | Heat of formation in gram-calories per cubic centimeter of compound | Latent Heat of fusion of the metal in calories per cubic centimeter | Latent heat of vaporization of the metal in calories per cubic centimeter | Specific heat of the metal in calories per cubic centimeter per ° C. near 20° C. |
|---|---|---|---|---|---|
| $NiH_2$ | 97.2 | 684 | 641 | 12,500 | 0.93 |
| $CuH$ | 79.3 | 506 | 438 | 11,200 | 0.81 |

Suitable hydrides include the stoichiometric hydrides of the alkali and alkaline earth metals and the non-stoichiometric getter hydrides, some of which are listed above in Tables I and II. The stoichiometric metallic hydrides are those of lithium, sodium, potassium, rubidium, cesium, francium, calcium, strontium, barium, and radium, all of which are suitable for this invention, except that some of them are currently expensive. Beryllium and magnesium form stoichiometric hydrides that decompose at low temperatures (beryllium hydride at about 125° C. and magnesium hydride at about 280° C. to 300° C.). Suitable non-stoichiometric hydrides, members of Group B, are those of scandium, titanium, vanadium, ytterbium, zirconium, niobium, hafnium, tantalum, the rare-earth metals (atomic numbers, 57–71), and the actinides (atomic numbers, 89–103), though many of these are currently expensive and difficult to obtain in quantity.

Also useful are the borohydrides—compounds of metals with the borohydride radical, $BH_4$. Examples are the borohydrides of aluminum, beryllium (decomposes at 123° C.), lithium (decomposes at 275° C.), sodium, zirconium, etc. Of course, for most applications, some of these are much more useful than others while still others are impractical in some situations. The selection can be made to accommodate the desired operating conditions.

Alloys of hydrides are also useful, including alloys of alkaline or alkaline earth hydrides alone, alloys of the non-stoichiometric hydrides, alloys comprised of members of each group, and alloys of or with borohydrides therewith. Hereafter the generic term type "B" hydride shall be used to designate the alkaline earth and alkaline hydrides as well as the Group B non-stoichiometric getter hydrides.

In addition to the endothermic processes described previously as means of heat transfer, utilization may be made of the latent heats of fusion and vaporization of the metals involved in the hydride and of a carrier for the hydride, such as ceramic or graphite. Fusion and vaporization are, of course, endothermic processes; fusion requiring on the order of a few hundred calories per cc. of metal and vaporization requiring about 5 to 15 kilocalories per cc. of metal. Similarly the heats of dissociation and of ionization for the liberated hydrogen upon the actual temperature of the nose cone in that application. This temperature, in turn, depends upon the velocity of the vehicle and the medium in which it is moving. These conditions determine to some extent the optimum choice of heat transfer material and of engineering design. The examples to be described will illustrate this. The gas temperature near the surface of the nose cone may be found from the following approximate formula $$T - T_o = \left(\frac{v}{100}\right)^2$$

where:

$v$=vehicle velocity in miles per hour.
$T_o$=initial temperature of the atmosphere in ° C.
$T$=temperature of the gas near the surface of the nose cone in ° C.

As an example of the use of the formula let:

$T_o = 0°$ C.
$v = 10,000$ miles per hour then:

$$T = \left[\frac{10,000}{100}\right]^2 = 10,000° \text{ C.}$$

In the event it is decided that advantage may be taken of the heats of dissociation and of ionization of the liberated gas, it may be desirable to employ "deuterides" instead of hydrides since the heats of dissociation and of ionization for deuterium are larger than those of hydrogen. For example, palladium deuteride, whose general properties correspond to those of palladium hydride, may be used.

Table IV shows the melting points of typical metals.

TABLE IV

*Melting and boiling points of the metals of Tables I, II, and III*

| Compound | Melting point at 1 atm. of the metal, ° C. | Boiling point at 1 atm. of the metal, ° C. |
| --- | --- | --- |
| LiH | 180 | 1,370 |
| NaH | 98 | 892 |
| KH | 63.4 | 770 |
| CaH$_2$ | 850 | 1,440 |
| SrH$_2$ | 770 | 1,380 |
| BaH$_2$ | 704 | 1,640 |
| TiH$_{1.75}$ | 1,812 | 3,535 |
| ZrH$_{1.92}$ | 1,852 | 5,000 |
| PdH$_{0.59}$ | 1,552 | 4,000 |
| NiH | 1,453 | 2,730 |
| CuH | 1,083 | 2,600 |

The heat dissociable materials are so chosen that the dissociation endotherm is approximately completed before temperatures are attained at which fusion of the metals involved takes place.

FIGS. 1-5 show another form of my invention especially well adapted to conditions where aerodynamic heating generated in a nose cone 80 at its surface 81 is enough to cause appreciable ionization of gases. Under these conditions oxidation is not a significant factor; however, this design may also be usable under the most general aerodynamic conditions. Here, an outer layer 82 of the nose cone 80 consists of ceramic, graphite, or other high refractory material in which is embedded a large number of closely spaced cells 83. The cells 83 extend from a non-porous base 84 of the refractory material to the outer surface 85 of the layer 82. The cells 83 may be on the order of a fraction of an inch in diameter and may be filled with suitable heat-dissociable material such as type "B" hydride or a combination of type "A" metal and type "B" hydride, for example. The whole outer surface 85 is then coated with a suitable plastic or vitreous material 86 that protects the heat dissociable material contained in the cells 83 from exposure to the elements prior to the time when heat generation at the surface of the nose cone should be dissipated.

The outer layer 82 is bonded with suitable materials to a non-porous subshell 87 that separates the outer layer 82 from the inner regions and provides structural support. Further in toward the center of the nose cone another similar subshell 88 is provided, the region between the subshells 87 and 88 being filled with a mass 89 of heat dissociable material such as type "B" hydride.

A shock-diffusion rod 90 extends along the axis 91 of the nose cone 80 from an interior portion 92 out beyond the tip 93 of the nose cone 80. The rod 90 can be moved out further and retracted by means of rack 94 and pinion 95, and will be described later. Seals 96 and 97 seal off the inner region 92 of the nose cone 80 from the atmosphere.

The function of the rod 90 is to dissipate part fo the shock wave encountered by the missile, and illustrated diagrammatically at W, so that aerodynamic heating is reduced at the surface 81 of the nose cone 80. The shock-diffusion rod 90 is tubular with a hollow center 98 along its entire length. The rod 90 may be constructed of a suitable refractory material such as graphite in which is embedded particles of heat dissociable material, or of solid heat dissociable material. The tip 99 and outermost portions of the rod 90 comprise a protective plastic or vitreous material which functions the same as the layer 86 and closes the opening 98 at the tip 99. Communication is provided between the central region 92 of the nose cone 80 and the region containing the hydride 89 through a gas driven turbine 100. This turbine 100 serves to motorize the rack and pinion assembly 94, 95 by gas impingement on the turbine blades. A further function of the turbine assembly 100 is to direct the gas from the region of the mass 89 through a hollow drive shaft 101 into the central region 92. The drive shaft 101 has a worm gear 102 that turns the pinion 95 to move the rack 94.

In operation, the shock wave W is partially diverted by the shock diffuser 90. Aerodynamic heating first dissipates the plastic or vitreous seal at the tip 99 of the rod 90. As further heat is generated at the tip 99, endothermic dissociation of the heat dissociable material of the rod 90 takes place, which helps to prolong the life of the rod. Meanwhile part of the shock wave energy is dissipated at the surface 81 of the nose cone 80, where it causes aerodynamic heating with the result that the protective plastic or vitreous coating over the nose cone surface is destroyed. Further heating causes the endothermic dissociation of the material within the cells 83 followed by the melting and vaporization of the metals involved, and subsequently the liberated gas and vapors rise to the surface 81 where they are dissociated and ionized. These are processes tending to cool the nose cone; however, some of the heat is transferred through layers 84 and 87 to the heat dissociable material 89, bringing about endothermic dissociation thereof.

The liberated gas from the mass 89 thus builds up pressure and, having communication with the lower pressure region 92 only by means of the gas turbine 100, is directed onto the turbine blades, actuating the turbine. This results in the motorizing of rack and pinion assembly with the consequent extrusion of the shock diffuser rod 90 out through the center of the nose cone 80. The most effective diversion of the shock wave W will be a function of the distance that the diffusion rod 90 extends out from the tip 93 of the nose cone 90; hence design of the nose cone assembly is chosen so that extrusion of the rod 90 proceeds at a rate that maintains the outer end of the rod 90 at the optimum distance from the nose cone tip 93.

A further aid to extending the life of the rod 90 is provided in that the elevation of pressure in the chamber 92, due to the influx of the gas flowing through the turbine 100 from the dissociation of the mass 89, results in forcing the gas through the rod 90 via the hole 98 up to the tip 99. There, the gas is subjected to the extreme heat being generated at the tip 99 and the gas endothermically dissociates and ionizes. These processes again tend to prevent destruction of the shock diffuser rod 90.

Thus the entire structure inherently results in endothermic processes that aid in prolonging the life of the nose cone 80. Under conditions in which aerodynamic heating is not of the magnitude required for appreciable ionization of gases, oxidation may take place at a significant rate, but this form of my invention is also applicable under these conditions, for the shock diffusion rod may be constructed in a form that does not permit passage of gases from the central region 92 of the nose cone 80 to the atmosphere, and thus possible explosion or burning of the contained gas is eliminated. In addition, possible oxidation of the material used to fill the cells 83 may be greatly reduced by replacing the hydride there with such material as graphite, ThO$_2$, Al$_2$O$_3$, or SiO$_2$.

FIGS. 1-5 are not intended to limit the possible construction of shock diffusion rods, motorizing assemblies or shell construction. A few of many possible shock-diffusion rod structures are given in FIGS. 6-11.

In FIGS. 6 and 7, a rod 110 is constructed of suitable heat dissociable material immersed in a high refractory material such as graphite in a form designed to impart structural rigidity. Several passages 111 extend through and along the entire length of the tube, each of which functions like the hole 98 in FIG. 1. Because of their multiplicity, the passages 111 act as a further aid to conduct the gas in the region 92 of FIG. 1 to the tip 112 of the rod 110, where the gas may dissociate and ionize.

FIGS. 8 and 9 show a rod 114, consisting of solid highly refractory material through which a hole 115 runs along the entire length of the rod. The hole again serves to conduct gas to a tip 116.

In FIGS. 10 and 11 is shown a rod 117 consisting of solid highly refractory material, such as non-porous graphite. This design is generally preferred when aerodynamic conditions are such that oxidation may occur, it then being undesirable that gases liberated from the heat dissociable material should be exposed to the atmosphere.

FIG. 12 shows one of many alternative methods of motorizing a shock diffusion rod 120 like the rod 90 depicted in FIG. 1 and also for providing gas to be conducted through a hole 121 to a tip 122 of the rod 120. Here, a nose cone 123 may be constructed of a highly refractory material such as ceramic or graphite, throughout which is embedded heat dissociable material 124 in a manner permitting gas passage throughout the structure and up to the surface, except through its center region. There the shock diffusion rod 120 may be extruded by means of a piston 125 enclosed in a cylinder 126 fixed to the inner body 127 of the missile. A pump 128, also in the inner body 127 of the missile, is provided to force a suitable liquid or fluid into the cylinder region 129 lying below the piston 125. Liquid or fluid is provided at a pump inlet 130 from a reservoir (not shown) located in the inner body 127 of the missile. A pump control 131 communicates by means of leads 132 with a temperature sensing element 133 located at a suitable region of the nose cone 113, and the two function to control the fluid flow into the region 129 of the cylinder 126 at a rate which provides optimum extrusion of the shock diffusion rod 120 beyond the tip 134 of the nose cone 123, as determined by the temperatures at the sensing element 133.

Seals 135 and 136 are also provided and function as in the construction of FIG. 1. Gas from a suitable reservoir (not shown) located within the missile body 127, enters the hole 121 in the shock diffusion rod 120 and travels up to the tip 122, where it may endothermically dissociate and ionize. The diffusion rod 120 may be constructed as in FIG. 1, for example.

In operation, partial diversion of the shock wave W is effected by the shock diffusion rod 120, and the areodynamic heating generated at the tip 122 causes the endothermic dissociation of the heat-dissociable material of which the rod 120 is composed. Additional cooling at the tip 122 is provided by the endothermic dissociation and ionization of the gas travelling up the rod 120 through the passage 121 from an inlet 137. Meanwhile, some aerodynamic heating is generated at the surface 138 of the nose 123, where it causes the endothermic dissociation of the heat dissociable material 124, as well as the dissociation of the carrier refractory at the outer surface, an additional aid to cooling. Further aids to cooling the nose cone 123 include the dissociation and ionization of any gases or vapors which rise to the surface and function as an effective heat barrier as explained previously. The temperature sensing element 133, responding to temperature changes in the nose cone 123, communicates to the pump control 131 by means of leads 132, thereby actuating the pump 128 and controlling the pumping rate so as to provide liquid or fluid to the region 129 below the piston 125. The influx of liquid or fluid in this region extends the piston 125 out of the cylinder 126 at a rate determined by the pump 128 to maintain the optimum effective distance of the shock diffusion rod 120 from the tip 134 of the nose cone 123.

The examples heretofore described have employed hydrides (including deuterides) as heat dissociable material; however this invention is not solely restricted to the use of these materials. For example, in FIG. 1 the fills for the cells 83 may consist of fully ingassed silver oxide ($Ag_2O$). Heat generated at the surface 81 of the nose cone 70 causes the endothermic dissociation of the silver oxide which requires 7250 calories per mole of compound. In this case, it is desirable to construct the outer layer 82 of a material which is already oxidized, such as ceramic, so that the evolved oxygen resulting from the dissociation of the silver oxide will not oxidize the carrier material but instead will rise to the surface 81, where it may be endothermically dissociated and ionized if temperatures at the surface are high enough. Further cooling is provided by the endothermic melting and vaporization of the silver residue contained in the cells 83 and again if the temperature at the surface 81 is high enough, the subsequent dissociation and ionization of the metallic vapors may take place. Finally the destruction of outer layer 85 of the carrier ceramic will take place but this is also an endothermic process which requires a large amount of heat. Thus the whole process is one which tends to prolong the life of the nose cone.

Examples of the relative magnitude of a few of the endothermic reactions previously described are tabulated in Table V.

TABLE V

| Column | 1 | 2 | 3 | 4 |
| --- | --- | --- | --- | --- |
| Reaction | Heat absorbed in calories per cubic centimeter of compound in reaction only | Heat of Column 1 plus heat from melting and vaporizing the metals | Heat of Column 2 plus heat of dissociation and ionization of the gas | Heat of Column 3 plus heat of dissociation and ionization of the metallic vapor |
| $2LiH \rightarrow 2Li + H_2$ | 2,230 | 6,330 | 42,930 | 55,730 |
| $TiH_2 \rightarrow Ti + H_2$ | 2,820 | 11,950 | 63,250 | 75,550 |
| $H_2 + Ni \rightarrow NiH_2$ | 684 | 11,054 | 92,554 | 113,024 |
| $TiH_2 + Ni \rightarrow Ti + NiH_2$ | 2,110 | 12,660 | 48,660 | 66,000 |
| $LiH + Cu \rightarrow CuH + Li$ | 1,585 | 8,950 | 30,500 | 48,550 |

The choice of the most desirable heat dissociable material for any particular application of this invention depends partly upon the characteristics of the material in which they are carried. For example, when it is desired to utilize heats of fusion and of vaporization of the metals involved, care should be taken to choose heat dissociable material whose native metal boiling point is below the melting temperature of the carrier. Thus, if a carrier refractory such as thorium dioxide ($ThO_2$) which has a melting point of approximately 3600° C. is chosen, then titanium hydride would be very suitable for use as heat dissociable material since titanium has a boiling point of 3535° C.

Referring to Table V, it may be seen that titanium hydride is among the best materials to choose when it is desirable to utilize the heats of dissociation and of ionization of the evolved gas. However, when it is desirable to utilize heats of fusion and of vaporization of the metals but not the heats of dissociation and of ionization of the liberated gases, then the reaction of titanium hydride and nickel (boiling point is 2730° C.) would be among the best materials to use.

As indicated previously, hydrides are very useful, but are not the only materials suitable. Merely by way of example, the following table lists the characteristics of some other suitable materials. Which material is to be preferred in any particular instance depends upon the conditions of that instance. What will be best in one instance may not be best in another.

As also indicated before, alloys or mixtures of the hydride-forming metals are quite feasible. For example, alloys or mixtures of sodium and potassium (or other hydrides) with each other or with calcium, of calcium with barium or strontium, of zirconium with titanium or tantalum, of tantalum with strontium or potassium or both, of titanium and tantalum, of zirconium, titanium and tantalum, may be used in this invention, or of the hydrides of said metals. The alloys or mixtures may be of equal quantities of each metal or its hydride, or the proportions may be varied in any manner desired to achieve desired results.

advantages. A carrier which sublimates in lieu of melting will retain its constituted form above its sublimation temperature even though its mass decreases by vaporization. Thus if its constituted form is porous it will retain its porous structure at elevated temperatures and vapors and gases arising from the material carried can intermix or rise to the surface of the carrier, where other processes involving the vapors and gases may take place. A material which melts directly would hinder or prevent this. The sublimation process itself is endothermic, and for graphite it has a magnitude of 140 k. cal./mole and occurs at 3500° C. at a pressure of 1 atmosphere.

TABLE VI

*Examples of other heat-dissociable materials besides hydrides and some of their properties*

| Compound | Boiling point of the metal, ° C. | Boiling point of compound in ° C. at 1 atm. | Heat of dissociation in cal./gm. at 25° C. and 1 atm. | Heat of dissociation in cal./cc. at 25° C. and 1 atm. | Comments |
|---|---|---|---|---|---|
| Oxides: | | | | | |
| $CaO$ | 1,440 | 2,850 | 2,710 | 7,090 | |
| $H_2O$ | | 100 | 3,790 | 3,790 | |
| $La_2O_3$ | 4,340 | 4,200 | 1,410 | 9,170 | |
| $Li_2O$ | 1,370 | [1] 1,000 | 4,770 | 9,570 | Sublimates at 1,000° C. |
| $MgO$ | 1,120 | 3,600 | 3,570 | 12,920 | |
| $NiO$ | 2,730 | | 724 | 5,770 | Forms $Ni_2O_3$ at 400° C. then $Ni_2O_3 \rightarrow NiO$ at 600° C. |
| $PdO$ | 4,000 | 877d | 171.5 | 1,425 | Dissociates at 877° C. |
| $Ag_2O$ | 2,212 | 300d | 31.3 | 223.5 | Dissociates at 300° C. |
| $LiO_2$ | 3,900 | [2] 2,176 | 1,000 | 10,900 | Melts at 2,176° C. |
| Fluorides: | | | | | |
| $CaF_2$ | 1,440 | [2] 1,330 | 3,720 | 10,830 | |
| $CrF_2$ | 2,500 | 1,300 | 2,010 | 8,250 | |
| $LiF$ | 1,370 | 1,670 | 5,640 | 12,900 | |
| $MgF_2$ | 1,120 | 2,227 | 4,230 | 12,700 | |
| $MnF_2$ | 2,087 | [2] 856 | 2,080 | 8,090 | Melts at 856° C. |
| $NaF$ | 892 | 1,704 | 3,240 | 9,030 | |
| Chlorides: | | | | | |
| $LaCl_3$ | 4,340 | [2] 907 | 1,073 | 4,230 | Melts at 907° C. |
| $LiCl$ | 1,370 | 1,360 | 2,300 | 4,770 | |
| $LuCl_3$ | | [2] 892 | 810 | 3,220 | Melts at 892° C. |
| $NdCl_3$ | | [2] 784 | 1,015 | 4,200 | Melts at 784° C. |
| $NaCl$ | 892 | 1,413 | 1,680 | 3,630 | |
| Misc.: | | | | | |
| $K_2SO_4$ | 770 | [2] 1,069 | 1,915 | 5,230 | Melts at 1,069° C. |
| $Na_2CO_3$ | 892 | 851 | 2,550 | 6,450 | |
| $VN$ | 3,400 | 2,050d | 631 | 3,550 | Dissociates at 2,050° C. |

[1] Sublimates.
[2] Melting point.

To aid in the selection of refractory and like materials for the carrier, the following table is given:

TABLE VII

*Examples of refractory carrier materials and heat-dissociable carried materials*

| Carrier material | Melting point of carrier at 1 atm. | Examples of suitable materials to be carried by the carrier when oxidation is not a problem and when the metal is to be vaporized |
|---|---|---|
| $ThO_2$ | 3,500° C. | $CaO$, $H_2O$, $NiO$, $Ag_2O$, $CaF_2$, $MgF_2$, $NaF$, $LiCl$, $NaCl$, $K_2SO_4$, $VN$, $LiH$, $KH$, $NiH$, $CuH$. |
| Graphite | Sublimes at 3,652° C. | $H_2O$, $MgO$, $AgO$, $CrF_2$, $LiF$, $NaCl$, $VN$, $NaH$, $CaH$, $TiH_{1.75}$, $NiH$. |
| $MgO$ | 2,800° C. | $H_2O$, $Li_2O$, $Ag_2O$, $CrF_2$, $MgF_2$, $NaCl$, $KH$, $SrH$, $_2CuH$. |

No matter which materials are chosen as the "carrier" and which as the material carried, it is essential for the embodiments wherein the material is embedded in the carrier, that the carrier be porous and that it retain its porosty or passageworks while the carried material is being vaporized. So the melting point of the carrier should be higher than the vaporization point of the carried material, for the carried material should be supported during its heat-transfer cycle in all the successive stages up to and including its vaporization.

Also it should be noted that carrier materials which do not melt but sublime at elevated temperatures, such as graphite does at ordinary pressures, have some important The nose cone 140 of FIG. 13 is similar in construction to that of FIG. 12, although shown in a greatly simplified manner. The piston-cylinder arrangement of FIG. 12 is not shown in FIG. 13 although it may be there. In FIG. 12 additional means for cooling the nose cone cermet or refractory mass 141 is provided at the base of the nose cone 140, where two inlets 142 and 143 are connected by piping 144, 145, and 146 to a pump 147. The pump 147 circulates gas provided from a suitable reservoir at point 148 through the pipes 149 and 146, 144 and 145 in the directions of the arrows up to inlet points 142 and 143. From these points gas is forced out through the nose cone mass 141 and up to the surface of the nose cone. At the same time gas is forced up through hold 150 of a shock diffusion rod 151 by means of either the piston cylinder arrangement shown in FIG. 12 or by any other suitable gas reservoir. The porous mass 141 is supported by a non-porous structure 153.

Additional cooling for the nose cone mass 141 over and above that described in FIG. 12 is provided as follows: Heat generated at the surface 152 of the nose cone 140 penetrates to the inner mass 141 and causes the endothermic dissociation of the heat dissociable material contained therein. The dissociated gas thus rises to the surface 152 where it is endothermically dissociated and ionized. But in addition to this, gas forced into the nose cone mass 141 through inlets 142 and 143 also rises to the surface 152 and provides additional cooling by its endothermic dissociation and ionization at the surface.

If the heat dissociable material is a type "B" hydride, then if hydrogen or deuterium is forced in at inlets 142 or 143, it may not combine with the heat dissociable material of type "B" hydride. However, if the heat dissociable material is either type "A" hydride or a mixture of types "A" and "B," an exothermic reaction may take place between the type "A" hydride and hydrogen or deuterium gas forced in at the inlets 142 and 143, thereby resulting in partial cooling of the nose cone 140. As the temperature is raised further, melting of the metal takes place, and the gas is again liberated. It will then rise to the surface of the nose cone and become endothermically dissociated and ionized. Meanwhile, metallic vapor also rises to the surface of the nose cone and is endothermically dissociated and ionized.

It must be emphasized that this particular design of nose cone cooling is for use when temperature conditions of the nose cone are sufficiently high so that oxidation does not take place at a significant rate. However, "inert" and other gases may be employed to be forced by pump 147 to the surface 152 of the nose cone 140 where it may endothermically dissociate and ionize. Examples of some of these other gases which may be employed are to be found in Table VIII, which also lists the corresponding heats of dissociation and ionization for these gases. The cooling provided by the gas forced through hole 150 in the shock diffusion rod 151 is done in the same manner as in FIG. 12, although again it must be emphasized that the piston cylinder and gas reservoir arrangement for FIG. 12 is not shown in FIG. 13.

TABLE VIII

*Example of other gases suitable for use as described in connection with FIG. 13*

| Gas | Heat in K. cal. required to dissociate and ionize one mole of gas at 1 atm. |
| --- | --- |
| $He_{para}$ | 1,063 |
| Ne | 497 |
| A | 362 |
| F | 465 |
| Xe | 279 |
| Cl | 657 |
| $H_2$ | 700 |

To those skilled in the art to which the invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A missile nose having an axially extending shock diffusion rod extending therebeyond from inside said missile and means for moving said rod outwardly as it is consumed by heat.

2. The nose of claim 1 wherein gas is brought to the surface of said rod and endothermically dissociated and ionized there.

3. The nose of claim 1 wherein the means for moving the rod outwardly comprises a mass of heat dissociable gas-liberating material in said nose, a gas turbine powered by liberated gas from said mass, and means employing the turbine power to move said rod outwardly.

4. The nose of claim 1 wherein the means for moving the rod outwardly comprises a power device actuated by a heat-sensitive control means in said nose adjacent the surface thereof.

5. The nose of claim 1 wherein said rod is tubular and has axially extending passage means.

6. The nose of claim 5 wherein said hollow rod communicates with a source of gas under pressure inside said nose.

7. The nose of claim 6 wherein said source of gas under pressure includes a mass of heat-dissociable gas-liberating material inside said nose.

8. The nose of claim 1 wherein said rod is solid.

No references cited.

BENJAMIN A. BORCHELT, *Primary Examiner.*

F. C. MATTERN, Jr., *Assistant Examiner.*